(12) United States Patent
Liao et al.

(10) Patent No.: US 11,966,557 B2
(45) Date of Patent: Apr. 23, 2024

(54) USER INTERFACE ADJUSTMENT METHOD AND APPARATUS, AND ELECTRONIC DEVICE

(71) Applicant: VIVO MOBILE COMMUNICATION CO., LTD., Guangdong (CN)

(72) Inventors: Weijian Liao, Guangdong (CN); Bowen Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/115,240

(22) Filed: Feb. 28, 2023

(65) Prior Publication Data

US 2023/0214086 A1 Jul. 6, 2023

Related U.S. Application Data

(63) Continuation of application No. PCT/CN2021/114555, filed on Aug. 25, 2021.

(30) Foreign Application Priority Data

Sep. 1, 2020 (CN) .......................... 202010904067.3

(51) Int. Cl.
*G06F 3/04817* (2022.01)
*G06F 3/04845* (2022.01)
*G06F 3/0488* (2022.01)

(52) U.S. Cl.
CPC ...... *G06F 3/04817* (2013.01); *G06F 3/04845* (2013.01); *G06F 3/0488* (2013.01)

(58) Field of Classification Search
CPC ............. G06F 3/04817; G06F 3/04845; G06F 3/0488; G06F 3/04847; G06F 3/04886; G06F 3/04883; G06F 3/0485
See application file for complete search history.

(56) References Cited

U.S. PATENT DOCUMENTS

2004/0090470 A1 5/2004 Kim
2006/0095147 A1 5/2006 Van De Kerkhof et al.
(Continued)

FOREIGN PATENT DOCUMENTS

CN 1761931 A 4/2006
CN 105117098 A 12/2015
(Continued)

OTHER PUBLICATIONS

First Office Action for Chinese Application No. 202010904067.3, dated Aug. 16, 2021, 9 Pages.
(Continued)

*Primary Examiner* — Andrey Belousov
(74) *Attorney, Agent, or Firm* — BROOKS KUSHMAN P.C.

(57) ABSTRACT

A user interface adjustment method and apparatus, and an electronic device are provided. The user interface adjustment method includes: receiving a first touch input on an icon adjustment control in a case that the icon adjustment control is displayed, where the icon adjustment control includes a plurality of adjustment regions, and the plurality of adjustment regions each are associated with a different icon display parameter; determining, in response to the first touch input, a target adjustment region corresponding to the first touch input and a target icon display parameter associated with the target adjustment region; and adjusting a display parameter of a target application icon to the target icon display parameter.

15 Claims, 11 Drawing Sheets

(56) References Cited

U.S. PATENT DOCUMENTS

2013/0106899 A1    5/2013  Bhatt
2013/0305187 A1   11/2013  Phillips et al.
2021/0132780 A1*   5/2021  Kyung ................ G06F 3/04847

FOREIGN PATENT DOCUMENTS

| CN | 105843124 A   | 8/2016  |
|----|---------------|---------|
| CN | 106126041 A   | 11/2016 |
| CN | 106293307 A   | 1/2017  |
| CN | 107943385 A   | 4/2018  |
| CN | 107978321 A   | 5/2018  |
| CN | 109725800 A   | 5/2019  |
| CN | 110515515 A   | 11/2019 |
| CN | 112099680 A   | 12/2020 |
| WO | 2013133905 A1 | 9/2013  |

OTHER PUBLICATIONS

International Search Report and Written Opinion for Application No. PCT/CN2021/114555, dated Nov. 15, 2021, 10 Pages.
Extended European Search Report for Application No. 21863546.4, dated Jan. 22, 2024, 12 Pages.

* cited by examiner

USER INTERFACE ADJUSTMENT METHOD AND APPARATUS, AND ELECTRONIC DEVICE

CROSS-REFERENCE TO RELATED APPLICATIONS

This application is a continuation of International Application No. PCT/CN2021/114555 filed on Aug. 25, 2021, which claims priority to Chinese Patent Application No. 202010904067.3, filed on Sep. 1, 2020, which are incorporated herein by reference in their entireties.

TECHNICAL FIELD

This application pertains to the field of communications technologies, and specifically relates to a user interface adjustment method and apparatus, and an electronic device.

BACKGROUND

With popularization of electronic devices such as mobile phones, users impose increasingly diversified demands on colors and patterns of wallpapers and application icons displayed on the electronic devices.

In the related art, the user may open a wallpaper setting window in system settings to change a desktop wallpaper in the wallpaper setting window. In addition, the user may alternatively download a theme system from a theme store, and replace a displayed theme with a downloaded theme system (for example, a cartoon theme or an animal theme) in a theme setting window of the system settings, so as to implement uniform replacement of a display mode of icons, wallpapers, texts, and the like. In this way, in a process of adjusting an application icon, the user needs to download a theme system first, and then open the theme setting window in the system settings to change the theme. In addition, during changing of the theme, the application icons, wallpapers, texts, and the like may be all adjusted to a display mode corresponding to the downloaded theme system.

It can be learned from the foregoing that an operation process of adjusting application icons in the related art is complex and features poor flexibility.

SUMMARY

Embodiments of this application are intended to provide a user interface adjustment method and apparatus, and an electronic device.

In order to resolve the foregoing technical problems, this application is implemented as follows:

According to a first aspect, an embodiment of this application provides a user interface adjustment method, including:

receiving a first touch input on an icon adjustment control in a case that the icon adjustment control is displayed, where the icon adjustment control includes a plurality of adjustment regions, and the plurality of adjustment regions each are associated with a different icon display parameter;

determining, in response to the first touch input, a target adjustment region corresponding to the first touch input and a target icon display parameter associated with the target adjustment region; and adjusting a display parameter of a target application icon to the target icon display parameter.

According to a second aspect, an embodiment of this application provides a user interface adjustment apparatus, including:

a first input module, configured to receive a first touch input on an icon adjustment control in a case that the icon adjustment control is displayed, where the icon adjustment control includes a plurality of adjustment regions, and the plurality of adjustment regions each are associated with a different icon display parameter;

a determining module, configured to determine, in response to the first touch input, a target adjustment region corresponding to the first touch input and a target icon display parameter associated with the target adjustment region; and a first adjustment module, configured to adjust a display parameter of a target application icon to the target icon display parameter.

According to a third aspect, an embodiment of this application provides an electronic device, where the electronic device includes a processor, a memory, and a program or instructions stored in the memory and capable of running on the processor, and when the program or instructions are executed by the processor, the steps of the method according to the first aspect are implemented.

According to a fourth aspect, an embodiment of this application provides a readable storage medium, where a program or instructions are stored in the readable storage medium, and when the program or instructions are executed by a processor, the steps of the method according to the first aspect are implemented.

According to a fifth aspect, an embodiment of this application provides a chip, where the chip includes a processor and a communications interface, the communications interface is coupled to the processor, and the processor is configured to run a program or instructions to implement the method according to the first aspect.

In the embodiments of this application, the first touch input on the icon adjustment control is received in a case that the icon adjustment control is displayed, where the icon adjustment control includes a plurality of adjustment regions, and the plurality of adjustment regions each are associated with a different icon display parameter; in response to the first touch input, the target adjustment region corresponding to the first touch input and the target icon display parameter associated with the target adjustment region are determined; and the display parameter of the target application icon is adjusted to the target icon display parameter. In this way, in the case that the icon adjustment control is displayed, touch operations are performed on different adjustment regions to adjust display parameters of application icons to the target icon display parameters associated with the target adjustment regions, featuring a simple operation process. In addition, the application icons can be adjusted without affecting other user interface elements such as desktop wallpapers and texts, thereby improving flexibility in adjusting the application icons.

DETAILED DESCRIPTION

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, a first object may be one or multiple. In addition, "and/or" in this specification and claims indicates at least one of connected objects, and the symbol "/" generally indicates that the associated objects are in an "or" relationship.

The following describes in detail a user interface adjustment method and apparatus and an electronic device provided in the embodiments of this application by using specific embodiments and application scenarios thereof with reference to the accompanying drawings.

Figure 1:
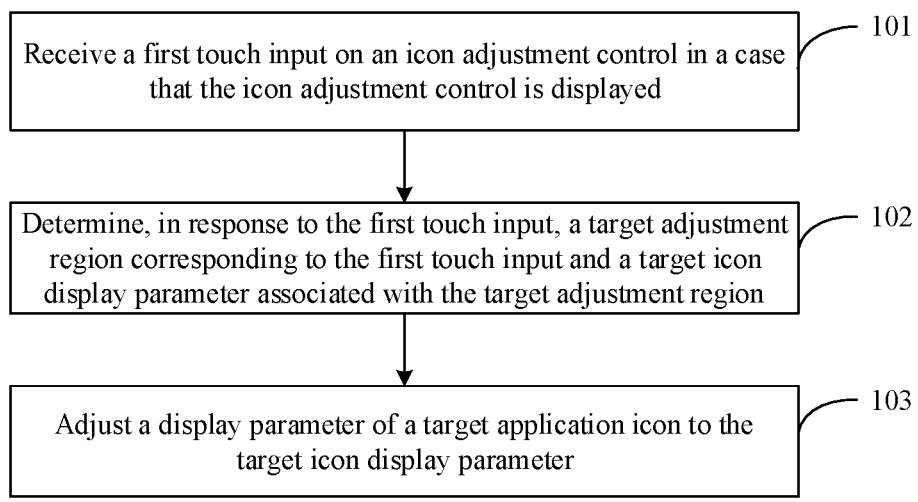
FIG. 1 is a flowchart of a user interface adjustment method according to an embodiment of this application.

Refer to FIG. 1. FIG. 1 is a flowchart of a user interface adjustment method according to an embodiment of this application. As shown in FIG. 1, the method may include the following steps.

Step 101: Receive a first touch input on an icon adjustment control in a case that the icon adjustment control is displayed, where the icon adjustment control includes a plurality of adjustment regions, and the plurality of adjustment regions each are associated with a different icon display parameter.

Step 102: Determine, in response to the first touch input, a target adjustment region corresponding to the first touch input and a target icon display parameter associated with the target adjustment region.

Step 103: Adjust a display parameter of a target application icon to the target icon display parameter.

Figure 2:
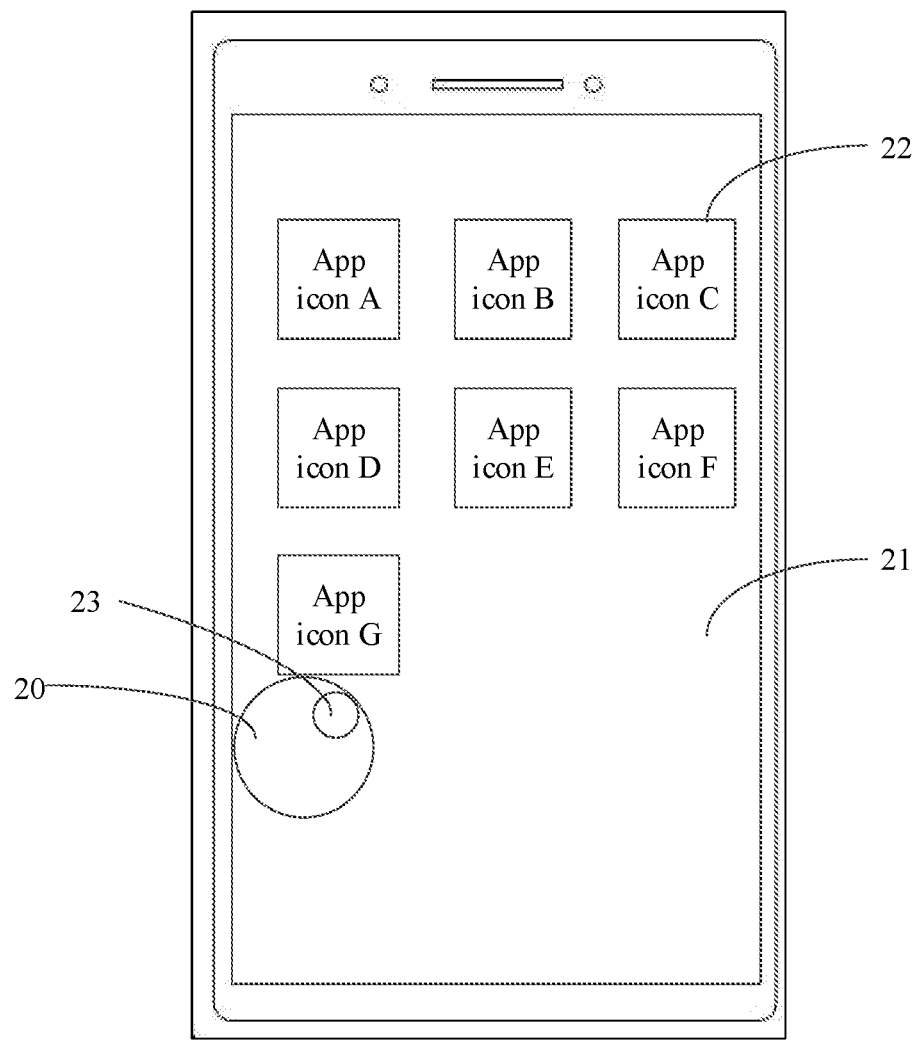
FIG. 2 is an application scenario diagram of a user interface adjustment method according to an embodiment of this application.

In specific implementation, the icon adjustment control may be displayed on a desktop, and for example, as shown in FIG. 2, may be floating on the desktop that includes a plurality of application icons. In specific implementation, displaying the icon adjustment control may be triggered by an operation input by the user; otherwise, the icon adjustment control may be hidden, that is, the icon adjustment control may not be displayed.

Certainly, the icon adjustment control may alternatively be displayed when the electronic device displays the desktop or any other screen, which is not specifically limited herein.

In specific implementation, that the icon adjustment control includes a plurality of adjustment regions and the plurality of adjustment regions each are associated with a different icon display parameter can be understood as: different regions in the icon adjustment control are associated with different icon display parameters. The icon display parameters may include: one or more of display parameters such as color, size, shape, and brightness.

In addition, the icon adjustment control includes at least a target adjustment region, and the target adjustment region may be: an adjustment region in which a touch point of the first touch input is located. In a case that the first touch input is a sliding input, the touch point of the first touch input may be an end point of the sliding input.

In this way, the user can preview a display effect of an application icon in real time during the operation, avoiding the problem that a plurality of adjustment operations need to be performed due to a non-ideal display effect of the application icon because an after-adjustment display effect of the application icon is viewed only after the operation is completed.

In an implementation, the target application icon may be application icons on all desktops.

In this implementation, display parameters of all the application icons on the electronic device can be uniformly adjusted by performing the first touch input, so as to prevent the user from adjusting the application icons separately.

In another implementation, in a case that the icon adjustment control is displayed on a target desktop, the target application icon may include only application icons on the target desktop.

Specifically, the icon adjustment control may be floating on the target desktop with application icons, and the adjusting a display parameter of a target application icon to the target icon display parameter may be that the display parameter of the target application icon on the target desktop changes along with movement of the touch point of the first touch input in different adjustment regions.

For example, as shown in FIG. 2, the icon adjustment control 20 is displayed on the target desktop 21, and the target desktop includes a plurality of target application icons 22. In this case, when a finger of the user touches the icon adjustment control 20 and the touch point 23 slides within the icon adjustment control 20, the display parameter of the target application icon 22 may gradually change along with sliding of the finger of the user.

In this implementation, before the user adjusts the application icons on the target desktop, the target desktop may be first switched to a currently displayed desktop. In addition, in this implementation, application icons on different desktops may have different display parameters, thereby improving diversification of application icons.

In an optional implementation, a coordinate system is displayed in the icon adjustment control, and the coordinate system has a first coordinate axis and a second coordinate axis that intersect.

The determining, in response to the first touch input, a target adjustment region corresponding to the first touch input and a target icon display parameter associated with the target adjustment region includes:

in response to the first touch input, determining, based on a first relative position of a touch position of the first touch input relative to the first coordinate axis, a first display parameter associated with the first relative position, and determining, based on a second relative position of the touch position relative to the second coordinate axis, a second display parameter associated with the second relative position; where the target icon display parameter includes the first display parameter and the second display parameter, and different positions in the coordinate system correspond to different first display parameters and/or different second display parameters.

In specific implementation, the first coordinate axis and the second coordinate axis that intersect may divide the icon adjustment control into four adjustment regions. For example, in the embodiment shown in FIG. 3, the icon adjustment control 30 is circular, and the first coordinate axis 31 is perpendicular to the second coordinate axis 32.

In specific implementation, the first display parameter and the second display parameter may be different types of display parameters, and the types of display parameters may include: icon size, icon shape, icon color, and so on. For example, in the embodiment shown in FIG. 3, different positions on the first coordinate axis 31 are associated with different icon sizes, and different positions on the second coordinate axis 32 are associated with different icon shapes. The different icon shapes may be icon shapes such as square, circle, and rhombus, or may be a transition shape between any two of icon shapes such as square, circle, and rhombus. For example, a transition shape between square and circle is a rounded rectangle.

Figure 3:
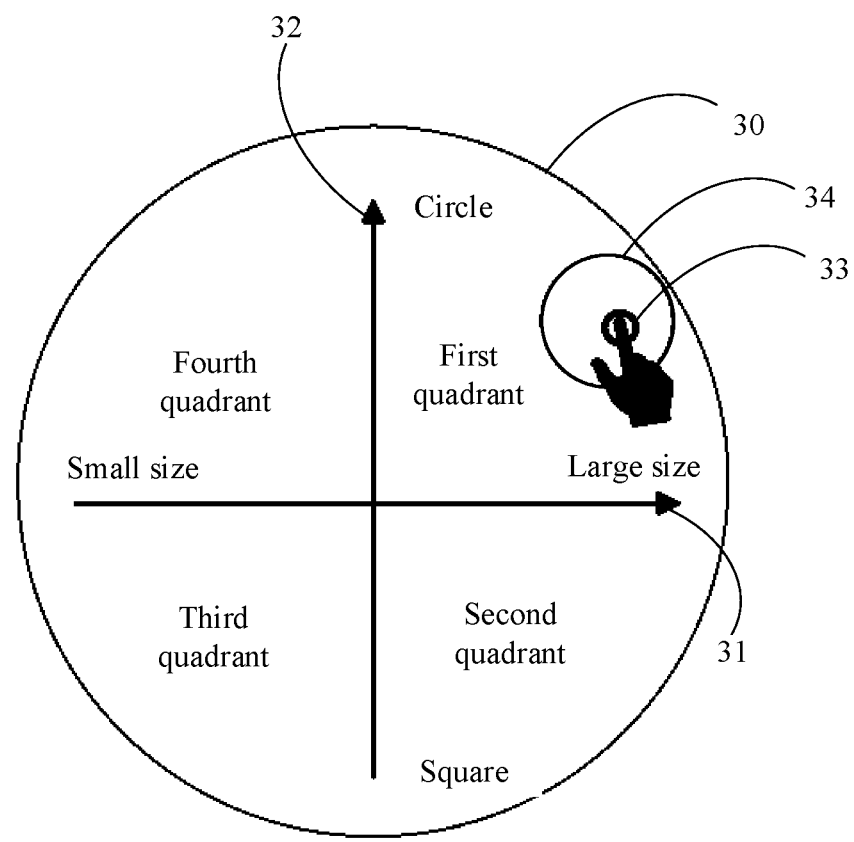
FIG. 3 is a first schematic diagram of an icon adjustment control in a user interface adjustment method according to an embodiment of this application.

It should be noted that the shape of the icon adjustment control is not limited to the circle in the embodiment shown in FIG. 3, and may alternatively be square, elliptical, and bar-shaped.

In addition, the coordinate system being displayed in the icon adjustment control may mean that the coordinate system is displayed in the icon adjustment control in an explicit manner. For example, in the embodiment shown in FIG. 3, the first coordinate axis 31 and the second coordinate axis 32 are displayed.

Certainly, in practical application, the coordinate system being displayed in the icon adjustment control can alternatively be that the coordinate system is displayed in an implicit manner. For example, the first coordinate axis and the second coordinate axis are hidden; and a relative position (for example, a position close to a left side or a right side of the target application icon) of an adjustment region corresponding to the first display parameter and the second display parameter in the coordinate system is determined based on the first display parameter and the second display parameter of the currently displayed target application icon, and the adjustment region is displayed in the coordinate system, for example, only an outer contour of the adjustment region 34 shown in FIG. 3 is displayed.

In an implementation, the first position can be understood as a position at which a straight line passing through the touch point 33 of the first touch input perpendicularly intersects the first coordinate axis 31. Similarly, the second position can be understood as a position at which a straight line passing through the touch point 33 of the first touch input perpendicularly intersects the second coordinate axis 32.

In another implementation, the first position may alternatively be a position at which a straight line passing through a center point of the adjustment region 34 perpendicularly intersects the first coordinate axis 31. Similarly, the second position can be understood as a position at which a straight line passing through a center point of the adjustment region 34 perpendicularly intersects the second coordinate axis 32, where the touch point 33 of the first touch input is located within the adjustment region 34.

In this implementation, the first display parameter and the second display parameter may be divided into a plurality of adjustable values. For example, in a case that the first display parameter is an icon size and the second display parameter is an icon shape, the icon size corresponding to the first coordinate axis may be any value between 1 cm (centimeter) and 2 cm (including 1 cm and 2 cm), and the icon shape corresponding to the second coordinate axis may be a rounded rectangle with any rounded corner size between circle and rectangle (including circle and rectangle).

Figure 4:
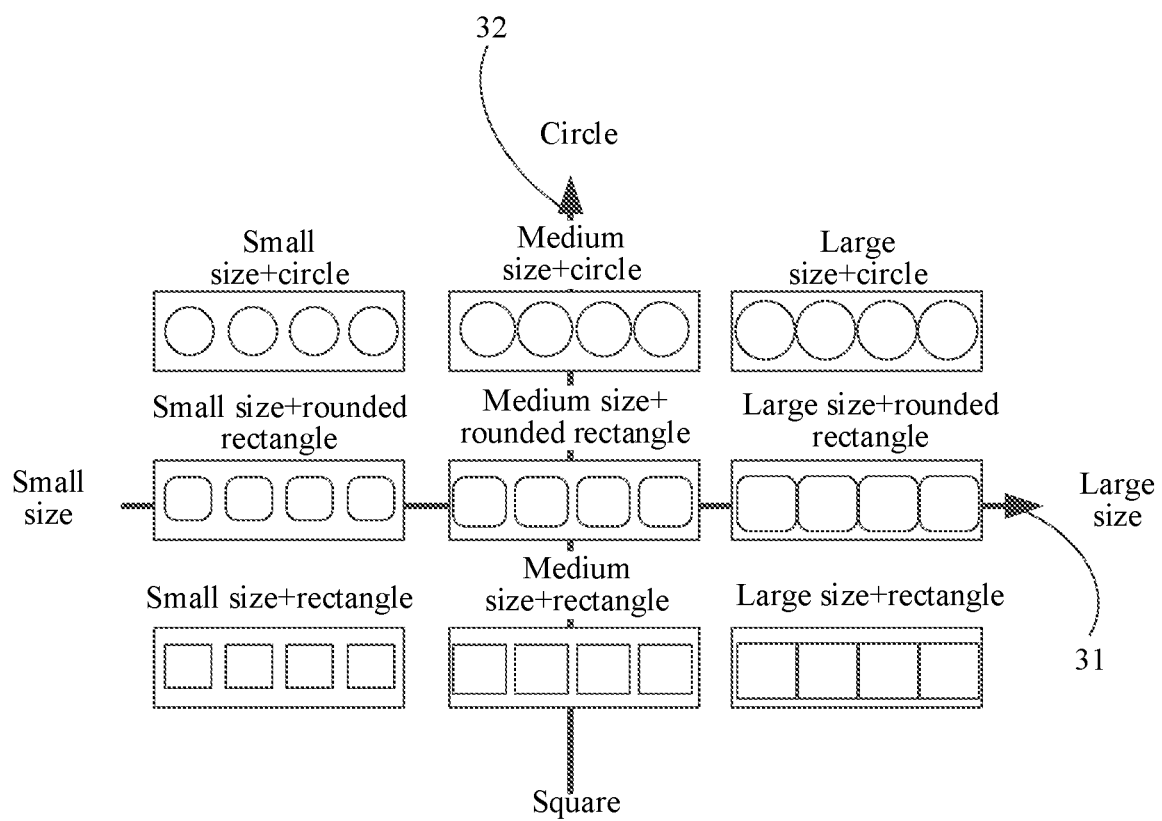
FIG. 4 is a second schematic diagram of an icon adjustment control in a user interface adjustment method according to an embodiment of this application.

Specifically, as shown in FIG. 4, the first coordinate axis is an abscissa axis, and the second coordinate axis is an ordinate axis. In addition, the left end of the abscissa axis corresponds to a small-sized icon, and the right end thereof corresponds to a large-sized icon. The lower end of the ordinate axis corresponds to a square icon, and the upper end thereof corresponds to a circular icon. If the touch point of the first touch input by the user is closer to the left end of the abscissa axis, the size of the application icon is smaller; or if the touch point of the first touch input by the user is closer to the right end of the abscissa axis, the size of the application icon is larger. Also, if the touch point of the first touch input by the user is closer to the lower end of the ordinate axis, the corner size of the application icon is smaller; or if the touch point of the first touch input by the user is closer to the upper end of the ordinate axis, the corner size of the application icon is larger.

For example, as shown in FIG. 3 and FIG. 4, in a case that the touch point of the first input is located in the first quadrant, the application icon is a large-sized circular icon; in a case that the touch point of the first input is located in the second quadrant, the application icon is a large-sized square icon; in a case that the touch point of the first input is located in the third quadrant, the application icon is a small-sized square icon; and in a case that the touch point of the first input is located in the fourth quadrant, the application icon is a small-sized circular icon.

It should be noted that, in actual implementation, division of the adjustment regions is not limited to the four quadrants in the embodiment shown in FIG. 3. Alternatively, it may be located on the first coordinate axis 31, and in this case, the application icon is a medium-sized icon; or it may be located on the second coordinate axis 32, and in this case, the application icon is a rounded rectangular icon with medium rounded corners. Furthermore, the icon size may alternatively be adjusted in units of 0.1 cm or less, and the rounded rectangle may also be adjusted in units of 0.1 cm or less.

In addition, during movement of the touch point of the first touch input, the first display parameter and the second display parameter of the target application icon may change in real time along with position movement of the touch point, for example, the first display parameter and the second display parameter are updated once at intervals of 0.1 millisecond, and the target application icon is adjusted based on the updated first display parameter and second display parameter.

In this implementation, the positions of the touch point of the first touch input on the first coordinate axis and the second coordinate axis are obtained, so as to implement infinite adjustment of the first display parameter and the second display parameter of the application icon, making the adjustment process of application icons smoother.

In this embodiment of this application, the first touch input on the icon adjustment control is received in a case that the icon adjustment control is displayed, where the icon adjustment control includes a plurality of adjustment regions, and the plurality of adjustment regions each are associated with a different icon display parameter; in response to the first touch input, the target adjustment region corresponding to the first touch input and the target icon display parameter associated with the target adjustment region are determined; and the display parameter of the target application icon is adjusted to the target icon display parameter. In this way, in the case that the icon adjustment control is displayed, touch operations are performed on different adjustment regions to adjust display parameters of application icons to the target icon display parameters associated with the target adjustment regions, featuring a simple operation process. In addition, the application icons can be adjusted without affecting other user interface elements such as desktop wallpapers and texts, thereby improving flexibility in adjusting the application icons.

Figure 5:
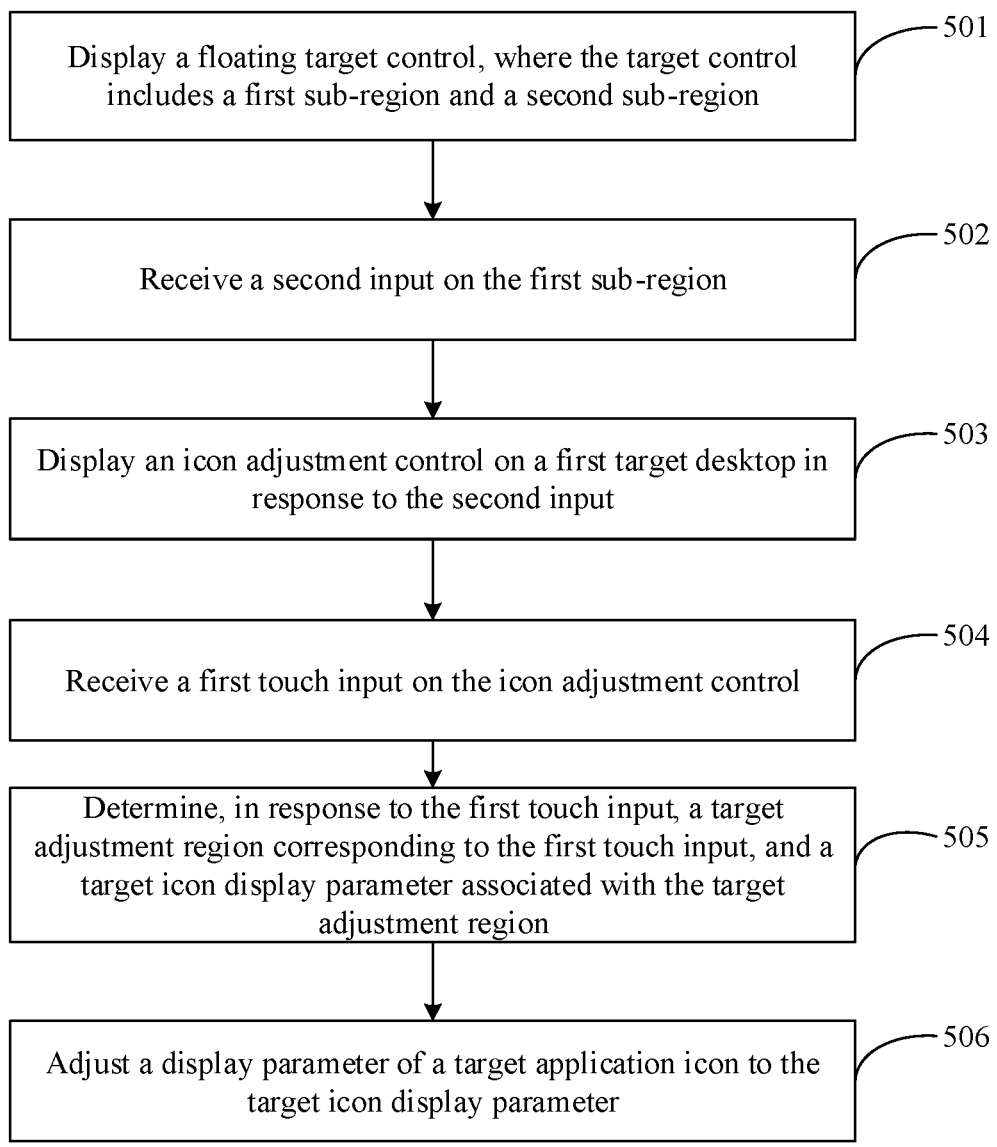
FIG. 5 is a flowchart of another user interface adjustment method according to an embodiment of this application.

Refer to FIG. 5. FIG. 5 is a flowchart of another user interface adjustment method according to an embodiment of this application. As shown in FIG. 5, a difference between this implementation and the user interface adjustment method shown in FIG. 1 lies in that: before the receiving a first touch input on an icon adjustment control in a case that the icon adjustment control is displayed, the method further includes the following steps.

Step 501: Display a floating target control, where the target control includes a first sub-region and a second sub-region.

Step 502: Receive a second input on the first sub-region.

Step 503: Display the icon adjustment control on a first target desktop in response to the second input.

It should be noted that step 504 in this embodiment of this application is the same as step 101 in the embodiment shown in FIG. 1, step 505 in this embodiment of this application is the same as step 102 in the embodiment shown in FIG. 1, and step 506 in this embodiment of this application is the same as step 103 in the embodiment shown in FIG. 1. To avoid repetition, details are not repeated herein.

Figure 6:
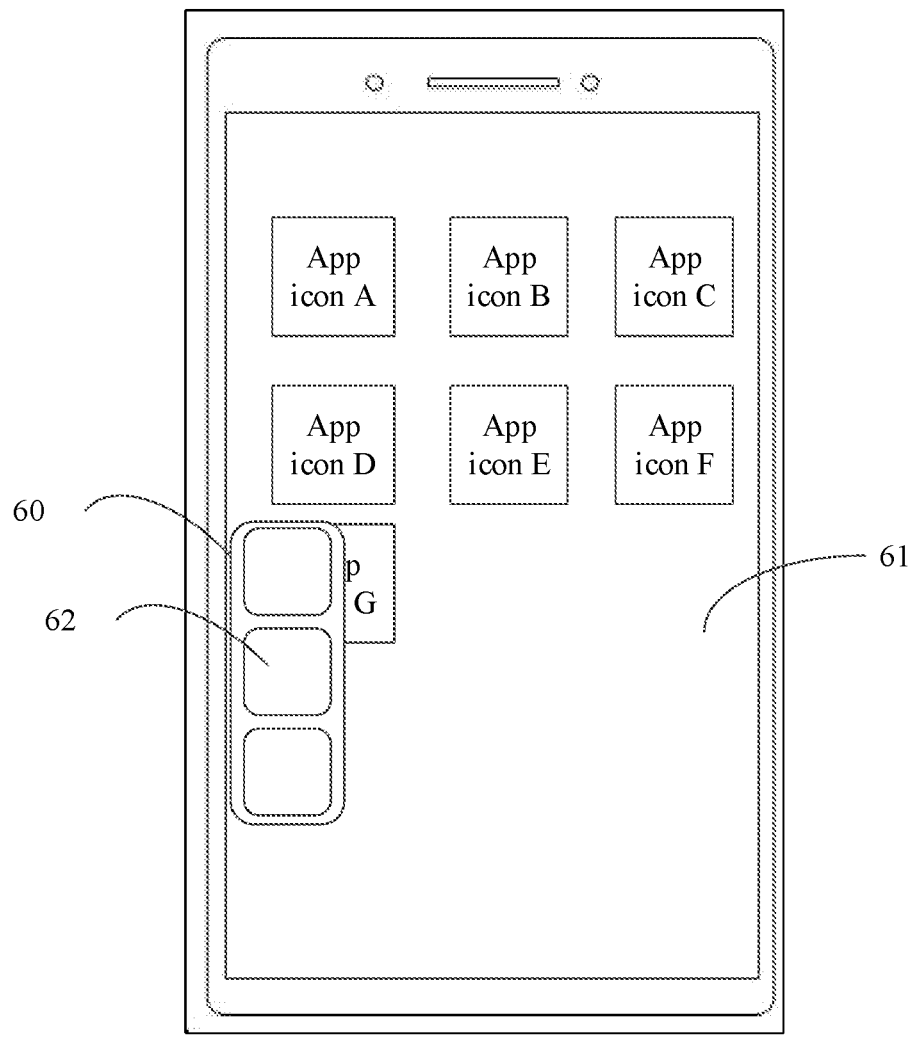
FIG. 6 is an application scenario diagram of another user interface adjustment method according to an embodiment of this application.

In implementation, the target control may be floating on the desktop, or any other system interface or application interface. For example, in an application scenario shown in FIG. 6, a target control 60 is floating on a desktop 61, and the target control 60 includes at least two sub-regions (the target control 60 in the embodiment shown in FIG. 6 includes three sub-regions 62). Different sub-regions have different display parameters or display icons, so that users can distinguish between different sub-regions.

In addition, the first target desktop may be a desktop displaying the target control, or a desktop preset by the user, or a desktop arranged on the 1st page by default, which is not specifically limited herein.

In addition, the second sub-region may correspond to a function of adjusting other user interface display parameters, such as desktop wallpaper, interface color, and application icon style. The number of second sub-regions may be one or more, for example, in the embodiment shown in FIG. 6, the target control 60 includes three sub-regions 62, namely one first sub-region and two second sub-regions. The two second sub-regions correspond to functions of adjusting different user interface display parameters (for example, one second sub-region is used for triggering adjustment of wallpaper display parameters, and the other second sub-region is used for triggering adjustment of application icon style).

In this implementation, the function of adjusting application icon display parameters and the function of adjusting other interface display parameters can be integrated into the target control, and when the user touches different regions, an adjustment process for different display parameters may be triggered, thereby simplifying the adjustment process for different display parameters.

Case 1:

After the displaying a floating target control, the method further includes:

receiving a third input on the second sub-region; and displaying an updated target wallpaper on a second target desktop in response to the third input.

In an implementation, same as the first target desktop, the second target desktop may be a desktop on which the floating target control is located.

Certainly, in another implementation, the second target desktop may include all desktops on the electronic device.

In specific implementation, the target wallpaper may be any one wallpaper in a preset wallpaper library, and different wallpapers may have different display parameters, for example, wallpapers with different display parameters such as color, brightness, and saturation, or wallpapers of different patterns.

In implementation, the third input may be a tap and touch operation. Specifically, all the wallpapers in the preset wallpaper library may be arranged in a preset arrangement order. In the process of adjusting a wallpaper on the second target desktop, a currently displayed wallpaper may be switched based on the number N of times of tapping included in the third input, specifically, the wallpaper of the second target desktop is switched to the N-th target wallpaper arranged after the currently displayed wallpaper.

In this way, switching of the desktop wallpaper can be easily implemented.

In this implementation, the function of adjusting application icon display parameters or the function of adjusting wallpapers can be triggered by performing an operation on different sub-regions in the target control, so as to easily implement adjustment of the wallpapers and the application icons.

Case 2:

After the displaying a floating target control, the method further includes:

receiving a fourth input on the second sub-region; and displaying the target application icon on a third target desktop in a target pattern in response to the fourth input.

Same as the first target desktop and the second target desktop, the third target desktop may be a desktop on which a target control is displayed, or may include all desktops on the electronic device.

In specific implementation, the fourth input may include one or more of touch operations such as tap, touch and hold, and slide.

In addition, the target pattern can alternatively be referred to a target mode or a target style, for example, at least one of a lineframe pattern, a gradient pattern, a hand-drawn pattern, and a fill pattern.

Figure 7:
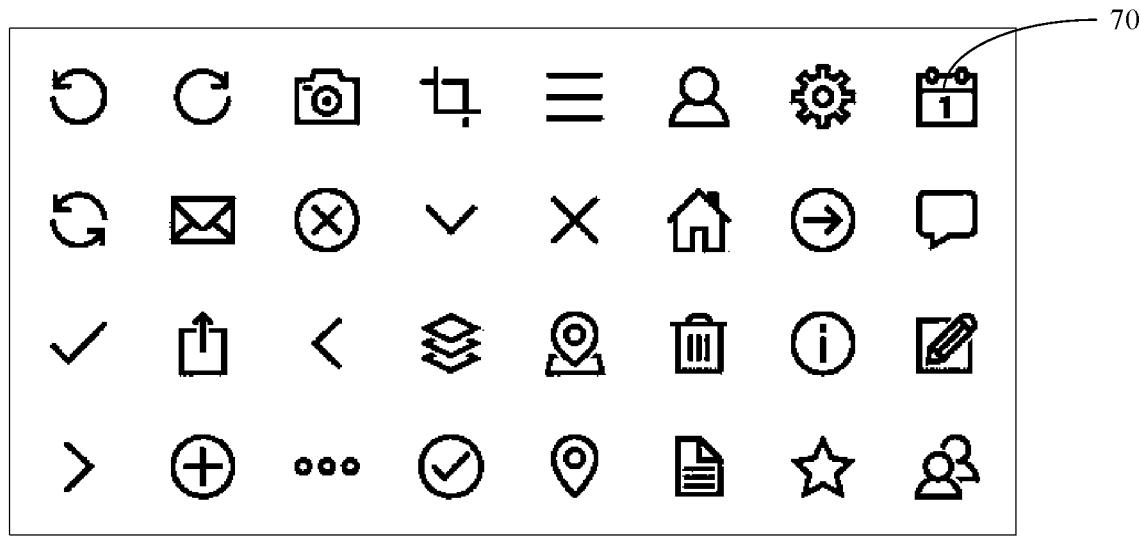
FIG. 7 is a first schematic diagram of icon patterns in another user interface adjustment method according to an embodiment of this application.

In implementation 1, in the lineframe pattern, the application icon is outlined by a lineframe, with a concise and clear display effect. For details, refer to a schematic diagram of the application icons 70 in the lineframe pattern shown in FIG. 7.

In implementation 2, in the gradient pattern, the application icon is filled with a color gradient, with a more beautiful display effect.

In implementation 3, in the hand-drawn pattern, the application icon is formed by a hand-drawn picture, with a better personalized display effect.

Figure 8:
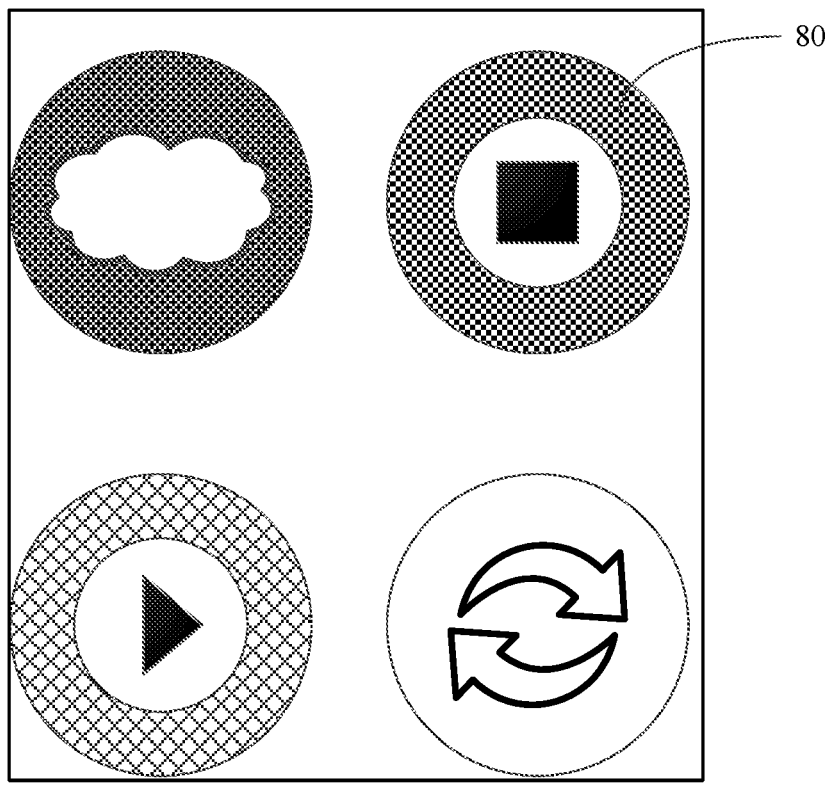
FIG. 8 is a second schematic diagram of icon patterns in another user interface adjustment method according to an embodiment of this application.

In implementation 4, in the fill pattern, background frames in which different application icons are located may be filled with blocks of different colors. For details, refer to a schematic diagram of the application icons 80 in the fill pattern shown in FIG. 8.

In specific implementation, the fourth input may be a tap operation on the second sub-region. In the implementation, all the patterns in the preset pattern library may be arranged based on a preset arrangement order. In the process of adjusting a pattern of a target application icon on the third target desktop, the current display pattern of the target application icon can be switched based on the number M of times of tapping included in the fourth input, specifically, the pattern of the target application icon is switched to the M-th display pattern arranged after the current display pattern.

In this way, switching of patterns of application icons can be easily implemented.

It should be noted that the number of second sub-regions may be one or more, and the foregoing case 1 and case 2 may be combined. In this case, the target control may include both the second sub-region for adjusting the wallpaper and the second sub-region for adjusting the pattern of the application icon, and the third input and fourth input may be touch inputs on different second sub-regions. For example, in the embodiment shown in FIG. 6, the target control 60 includes two second sub-regions. When one second sub-region is touched, the desktop wallpaper can be switched, and when the other second sub-region is touched, the pattern of the application icon can be switched.

In addition, in specific implementation, the number of second sub-regions may alternatively be three or more, and different second sub-regions may trigger adjustment of display parameters such as application icons, brightness, saturation, wallpaper, and fonts in the user interface, which are not provided one by one herein.

In this embodiment of this application, the adjustment of user interface display parameters such as application icons, desktop wallpapers, and icon patterns can be triggered separately by performing touch operations on different sub-regions in the target control. The adjustment process is simplified, and combination types of different user interface elements such as application icons, desktop wallpapers, and icon patterns can be increased, thereby improving flexibility of the user interface adjustment method.

It should be noted that the user interface adjustment method provided in the embodiments of this application may be executed by a user interface adjustment apparatus, or by a control module for executing the user interface adjustment method in the user interface adjustment apparatus. In the embodiments of this application, the user interface adjustment apparatus provided in the embodiments of this application is described by using the user interface adjustment method being executed by the user interface adjustment apparatus as an example.

Figure 9:
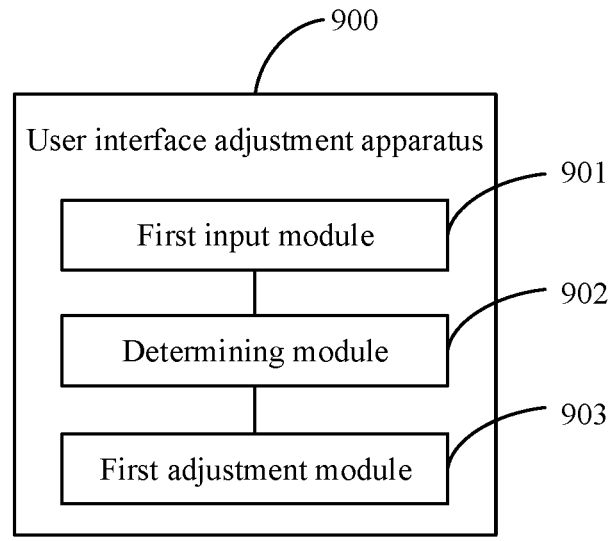
FIG. 9 is a first structural diagram of a user interface adjustment apparatus according to an embodiment of this application.

Refer to FIG. 9. FIG. 9 is a structural diagram of a user interface adjustment apparatus according to an embodiment of this application. As shown in FIG. 9, the user interface adjustment apparatus 900 includes:

a first input module 901, configured to receive a first touch input on an icon adjustment control in a case that the icon adjustment control is displayed, where the icon adjustment control includes a plurality of adjustment regions, and the plurality of adjustment regions each are associated with a different icon display parameter;

a determining module 902, configured to determine, in response to the first touch input, a target adjustment region corresponding to the first touch input and a target icon display parameter associated with the target adjustment region; and a first adjustment module 903, configured to adjust a display parameter of a target application icon to the target icon display parameter.

Optionally, a coordinate system is displayed in the icon adjustment control, and the coordinate system has a first coordinate axis and a second coordinate axis that intersect.

The determining module 902 is specifically configured to:

in response to the first touch input, determine, based on a first relative position of a touch position of the first touch input relative to the first coordinate axis, a first display parameter associated with the first relative position, and determine, based on a second relative position of the touch position relative to the second coordinate axis, a second display parameter associated with the second relative position; where the target icon display parameter includes the first display parameter and the second display parameter, and different positions in the coordinate system correspond to different first display parameters and/or different second display parameters.

Further, the first display parameter is a shape parameter, and the second display parameter is a size parameter.

Figure 10:
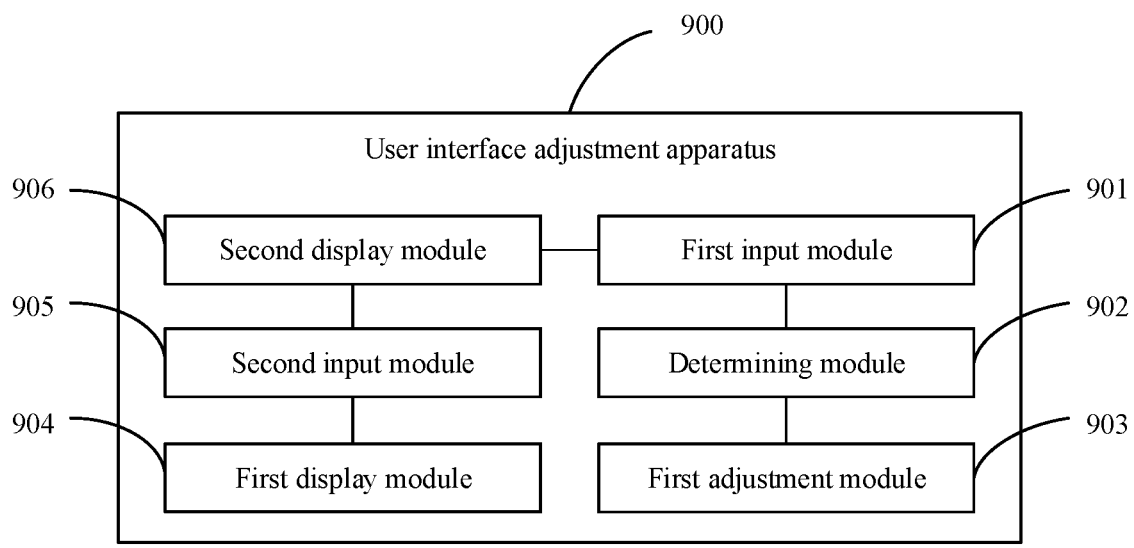
FIG. 10 is a second structural diagram of a user interface adjustment apparatus according to an embodiment of this application.

Optionally, as shown in FIG. 10, the user interface adjustment apparatus 900 further includes:

a first display module 904, configured to display a floating target control, where the target control includes a first sub-region and a second sub-region;

a second input module 905, configured to receive a second input on the first sub-region; and a second display module 906, configured to display the icon adjustment control on a first target desktop in response to the second input.

Figure 11:
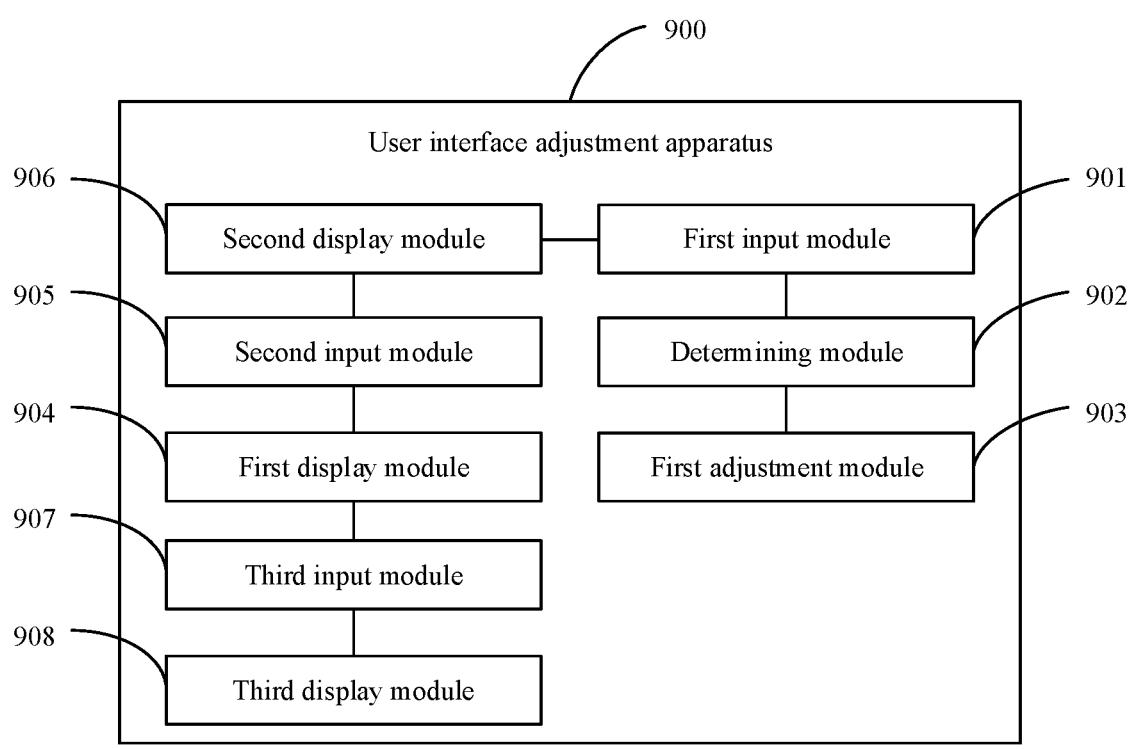
FIG. 11 is a third structural diagram of a user interface adjustment apparatus according to an embodiment of this application.

Optionally, as shown in FIG. 11, the user interface adjustment apparatus 900 further includes:

a third input module 907, configured to receive a third input on the second sub-region; and a third display module 908, configured to display an updated target wallpaper on a second target desktop in response to the third input.

Figure 12:
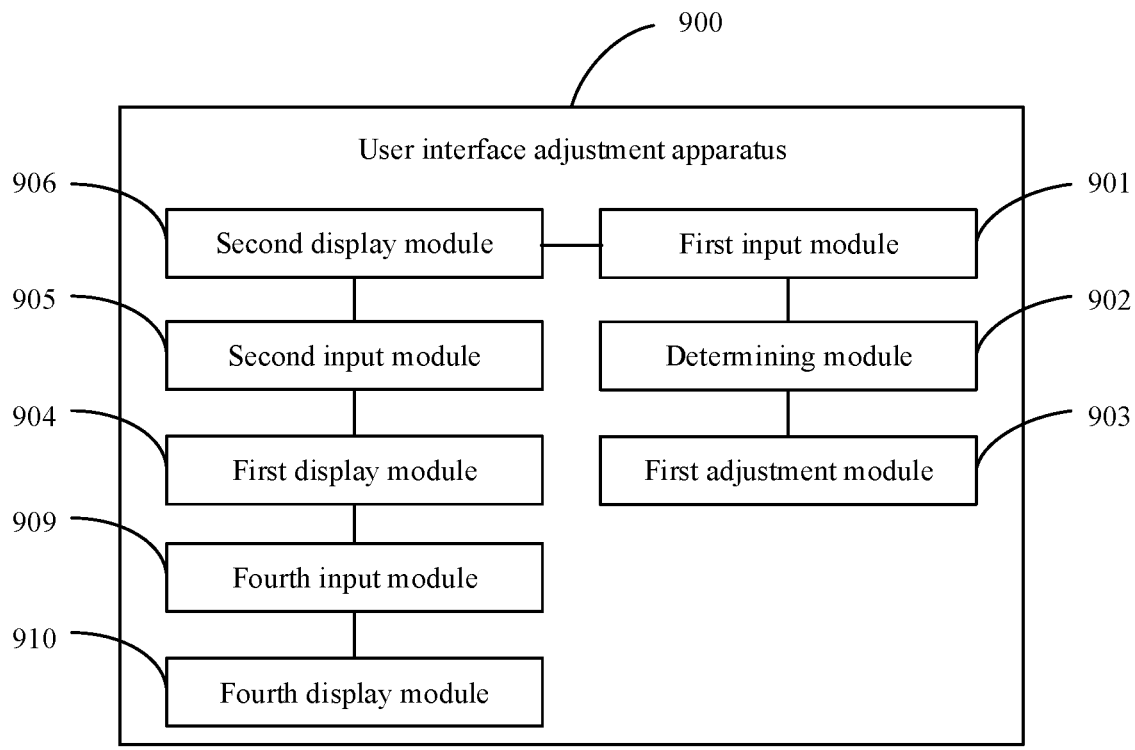
FIG. 12 is a fourth structural diagram of a user interface adjustment apparatus according to an embodiment of this application.

Optionally, as shown in FIG. 12, the user interface adjustment apparatus 900 further includes:

a fourth input module 909, configured to receive a fourth input on the second sub-region; and a fourth display module 910, configured to display the target application icon on a third target desktop in a target pattern in response to the fourth input.

Further, the target pattern includes at least one of lineframe pattern, gradient pattern, and fill pattern.

The user interface adjustment apparatus provided in this embodiment of this application can conveniently and quickly adjust display parameters of application icons, without affecting display parameters of other objects (such as wallpapers or texts) in the user interface, thereby featuring relatively high flexibility.

The user interface adjustment apparatus in this embodiment of this application may be an apparatus, or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a network-attached storage (NAS), a personal computer (PC), a television (TV), a teller machine, a self-service machine, or the like. This is not specifically limited in the embodiments of this application.

The user interface adjustment apparatus in this embodiment of this application may be an apparatus with an operating system. The operating system may be an Android operating system, an iOS operating system, or other possible operating systems, and is not specifically limited in the embodiments of this application.

The user interface adjustment apparatus provided in this embodiment of this application is capable of implementing the processes that are implemented by the method embodiments in FIG. 1 and FIG. 5. To avoid repetition, details are not described herein again.

Figure 13:
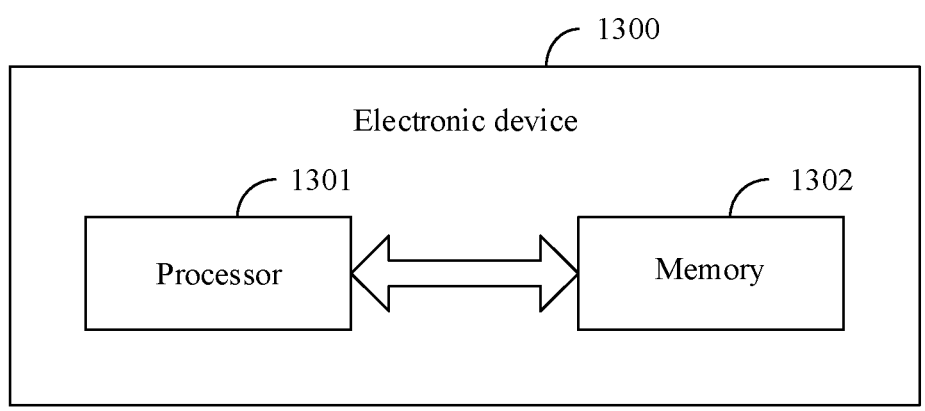
FIG. 13 is a structural diagram of an electronic device according to an embodiment of this application.

Optionally, as shown in FIG. 13, an embodiment of this application further provides an electronic device 1300, including a processor 1301, a memory 1302, and a program or instructions stored in the memory 1302 and capable of running on the processor 1301. When the program or instructions are executed by the processor 1301, the processes of the foregoing embodiments of the user interface adjustment method are implemented, with the same technical effects achieved. To avoid repetition, details are not described herein again.

It should be noted that the electronic device in this embodiment of this application includes the aforementioned mobile electronic device and non-mobile electronic device.

Figure 14:
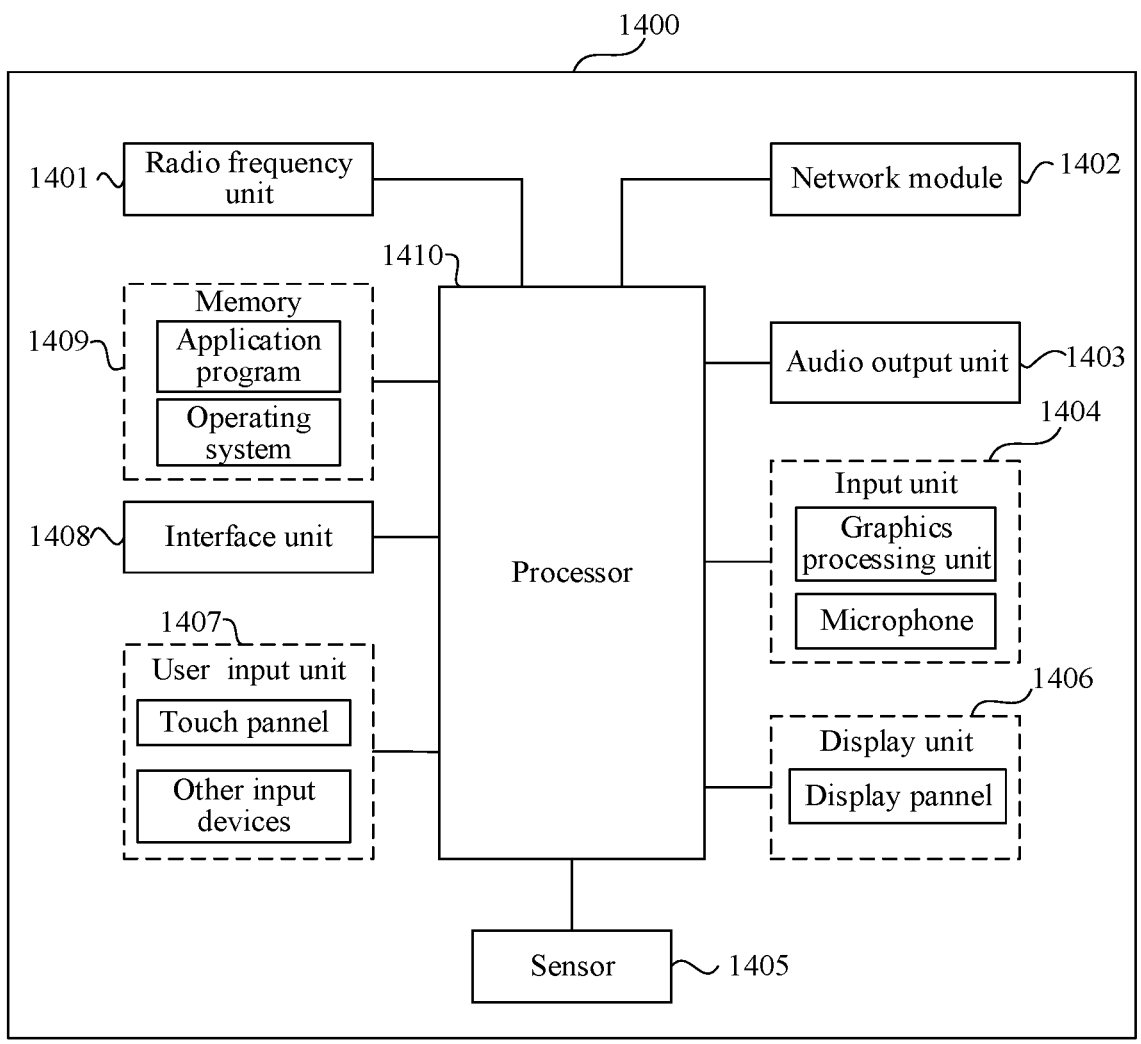
FIG. 14 is a structural diagram of another electronic device according to an embodiment of this application.

FIG. 14 is a schematic diagram of a hardware structure of an electronic device for implementing the embodiments of this application.

The electronic device 1400 includes but is not limited to components such as a radio frequency unit 1401, a network module 1402, an audio output unit 1403, an input unit 1404, a sensor 1405, a display unit 1406, a user input unit 1407, an interface unit 1408, a memory 1409, and a processor 1410.

A person skilled in the art can understand that the electronic device 1400 may further include a power supply (for example, a battery) supplying power to all components, and the power supply may be logically connected to the processor 1410 through a power management system. In this way, functions such as charge management, discharge management, and power consumption management are implemented by using the power management system. The structure of the electronic device shown in FIG. 14 does not constitute any limitation on the electronic device. The electronic device may include more or fewer components than those shown in the figure, or a combination of some components, or the components disposed differently. Details are not repeated herein.

The user input unit 1407 is configured to: receive a first touch input on an icon adjustment control in a case that the icon adjustment control is displayed by the display unit 1406, where the icon adjustment control includes a plurality of adjustment regions, and the plurality of adjustment regions each are associated with a different icon display parameter.

The processor 1410 is configured to determine, in response to the first touch input, a target adjustment region corresponding to the first touch input and a target icon display parameter associated with the target adjustment region.

The display unit 1406 is configured to adjust a display parameter of a target application icon to the target icon display parameter.

The determining, by the processor 1410 in response to the first touch input, a target adjustment region corresponding to the first touch input and a target icon display parameter associated with the target adjustment region includes:

in response to the first touch input, determining, based on a first relative position of a touch position of the first touch input relative to the first coordinate axis, a first display parameter associated with the first relative position, and determining, based on a second relative position of the touch position relative to the second coordinate axis, a second display parameter associated with the second relative position; where the target icon display parameter includes the first display parameter and the second display parameter, and different positions in the coordinate system correspond to different first display parameters and/or different second display parameters.

Further, the first display parameter is a shape parameter, and the second display parameter is a size parameter.

Optionally, before the user input unit 1407 receives a first touch input on an icon adjustment control in a case that the icon adjustment control is displayed by the display unit 1406, the display unit 1406 is configured to display a floating target control, where the target control includes a first sub-region and a second sub-region;

the user input module 1407 is further configured to receive a second input on the first sub-region; and the display unit 1406 is further configured to display the icon adjustment control on a first target desktop in response to the second input.

Optionally, after the display unit 1406 displays the floating target control, the user input module 1407 is further configured to receive a third input on the second sub-region; and the display unit 1406 is further configured to display an updated target wallpaper on a second target desktop in response to the third input.

Optionally, after the display unit 1406 displays the floating target control:

the user input module 1407 is further configured to receive a fourth input on the second sub-region; and the display unit 1406 is further configured to display the target application icon on a third target desktop in a target pattern in response to the fourth input.

Optionally, a coordinate system is displayed in the icon adjustment control, and the coordinate system has a first coordinate axis and a second coordinate axis that intersect.

Further, the target pattern includes at least one of lineframe pattern, gradient pattern, and fill pattern.

The electronic device provided in this embodiment of this application is capable of implementing the processes in the method embodiment shown in FIG. 1 and FIG. 5, with the same beneficial effects achieved. To avoid repetition, details are not described herein again.

It can be understood that in this embodiment of this application, the input unit 1404 may include a graphics processing unit (GPU) and a microphone. The graphics processing unit processes image data of a still picture or video obtained by an image capture apparatus (such as a camera) in a video capture mode or an image capture mode. The display unit 1406 may include a display panel, and the display panel 1406 may be configured in a form of a liquid crystal display, an organic light-emitting diode, and the like. The user input unit 1407 may include a touch panel and other input devices. The touch panel is also referred to as a touchscreen. The touch panel may include two parts: a touch detection apparatus and a touch controller. The other input devices may include but are not limited to a physical keyboard, a function key (such as a volume control key or a power on/off key), a trackball, a mouse, a joystick, and the like. Details are not described herein. The memory 1409 may be configured to store software programs and various data, including but not limited to application programs and an operating system. The processor 1410 may integrate an application processor and a modem processor, where the application processor mainly processes the operating system, user interfaces, application programs, and the like, and the modem processor mainly processes wireless communication. It can be understood that the modem processor may alternatively be not integrated in the processor 1410.

An embodiment of this application further provides a readable storage medium, where a program or instructions are stored in the readable storage medium. When the program or instructions are executed by a processor, the processes of the foregoing embodiment of the user interface adjustment method are implemented, with the same technical effects achieved. To avoid repetition, details are not described herein again.

The processor is a processor in the electronic device described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or instructions to implement the processes of the foregoing embodiments of the user interface adjustment method, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A user interface adjustment method, comprising:
receiving a first touch input on an icon adjustment control in a case that the icon adjustment control is displayed, wherein the icon adjustment control comprises a plurality of adjustment regions, and the plurality of adjustment regions each are associated with a different icon display parameter;
determining, in response to the first touch input, a target adjustment region corresponding to the first touch input and a target icon display parameter associated with the target adjustment region; and
adjusting a display parameter of a target application icon to the target icon display parameter;
wherein a coordinate system is displayed in the icon adjustment control, and the coordinate system has a first coordinate axis and a second coordinate axis that intersect; and
the determining, in response to the first touch input, the target adjustment region corresponding to the first touch input and the target icon display parameter associated with the target adjustment region comprises:
in response to the first touch input, determining, based on a first relative position of a touch position of the first touch input relative to the first coordinate axis, a first display parameter associated with the first relative position, and determining, based on a second relative position of the touch position relative to the second coordinate axis, a second display parameter associated with the second relative position; wherein the target icon display parameter comprises the first display parameter and the second display parameter, and different positions in the coordinate system correspond to different first display parameters and/or different second display parameters.

2. The method according to claim 1, wherein the first display parameter is a shape parameter, and the second display parameter is a size parameter.

3. The method according to claim 1, wherein before the receiving a first touch input on an icon adjustment control in a case that the icon adjustment control is displayed, the method further comprises:

displaying a floating target control, wherein the target control comprises a first sub-region and a second sub-region;

receiving a second input on the first sub-region; and displaying the icon adjustment control on a first target desktop in response to the second input.

4. The method according to claim 3, wherein after the displaying a floating target control, the method further comprises:

receiving a third input on the second sub-region; and displaying an updated target wallpaper on a second target desktop in response to the third input.

5. The method according to claim 3, wherein after the displaying a floating target control, the method further comprises:

receiving a fourth input on the second sub-region; and displaying the target application icon on a third target desktop in a target pattern in response to the fourth input; wherein the target pattern comprises at least one of lineframe pattern, gradient pattern, and fill pattern.

6. A user interface adjustment apparatus, comprising: a memory, a processor and a computer program stored in the memory and executable by the processor, wherein the processor is operable to execute the computer program to:

receive a first touch input on an icon adjustment control in a case that the icon adjustment control is displayed, wherein the icon adjustment control comprises a plurality of adjustment regions, and the plurality of adjustment regions each are associated with a different icon display parameter;

determine, in response to the first touch input, a target adjustment region corresponding to the first touch input and a target icon display parameter associated with the target adjustment region; and adjust a display parameter of a target application icon to the target icon display parameter;

wherein a coordinate system is displayed in the icon adjustment control, and the coordinate system has a first coordinate axis and a second coordinate axis that intersect; and the processor is operable to execute the computer program to:

in response to the first touch input, determine, based on a first relative position of a touch position of the first touch input relative to the first coordinate axis, a first display parameter associated with the first relative position, and determine, based on a second relative position of the touch position relative to the second coordinate axis, a second display parameter associated with the second relative position; wherein the target icon display parameter comprises the first display parameter and the second display parameter, and different positions in the coordinate system correspond to different first display parameters and/or different second display parameters.

7. The apparatus according to claim 6, wherein the first display parameter is a shape parameter, and the second display parameter is a size parameter.

8. The apparatus according to claim 6, wherein the processor is operable to execute the computer program to:

display a floating target control, wherein the target control comprises a first sub-region and a second sub-region;

receive a second input on the first sub-region; and display the icon adjustment control on a first target desktop in response to the second input.

9. The apparatus according to claim 8, wherein the processor is operable to execute the computer program to:

receive a third input on the second sub-region; and display an updated target wallpaper on a second target desktop in response to the third input.

10. The apparatus according to claim 8, wherein the processor is operable to execute the computer program to:

receive a fourth input on the second sub-region; and display the target application icon on a third target desktop in a target pattern in response to the fourth input; wherein the target pattern comprises at least one of lineframe pattern, gradient pattern, and fill pattern.

11. A non-transitory readable storage medium, wherein the non-transitory readable storage medium stores a program or instructions executable by a processor to:

receive a first touch input on an icon adjustment control in a case that the icon adjustment control is displayed, wherein the icon adjustment control comprises a plurality of adjustment regions, and the plurality of adjustment regions each are associated with a different icon display parameter;

determine, in response to the first touch input, a target adjustment region corresponding to the first touch input and a target icon display parameter associated with the target adjustment region; and adjust a display parameter of a target application icon to the target icon display parameter;

wherein a coordinate system is displayed in the icon adjustment control, and the coordinate system has a first coordinate axis and a second coordinate axis that intersect; and the program or instructions are executable by the processor to:

in response to the first touch input, determine, based on a first relative position of a touch position of the first touch input relative to the first coordinate axis, a first display parameter associated with the first relative position, and determine, based on a second relative position of the touch position relative to the second coordinate axis, a second display parameter associated with the second relative position; wherein the target icon display parameter comprises the first display parameter and the second display parameter, and different positions in the coordinate system correspond to different first display parameters and/or different second display parameters.

12. The non-transitory readable storage medium according to claim 11, wherein the first display parameter is a shape parameter, and the second display parameter is a size parameter.

13. The non-transitory readable storage medium according to claim 11, wherein before the receiving a first touch input on an icon adjustment control in a case that the icon adjustment control is displayed, the program or instructions are executable by the processor to:
- display a floating target control, wherein the target control comprises a first sub-region and a second sub-region;
- receive a second input on the first sub-region; and
- display the icon adjustment control on a first target desktop in response to the second input.

14. The non-transitory readable storage medium according to claim 13, wherein after the displaying a floating target control, the program or instructions are executable by the processor to:
- receive a third input on the second sub-region; and
- display an updated target wallpaper on a second target desktop in response to the third input.

15. The non-transitory readable storage medium according to claim 13, wherein after the displaying a floating target control, the program or instructions are executable by the processor to:
- receive a fourth input on the second sub-region; and
- display the target application icon on a third target desktop in a target pattern in response to the fourth input; wherein
- the target pattern comprises at least one of lineframe pattern, gradient pattern, and fill pattern.

* * * * *